United States Patent Office 3,660,519
Patented May 2, 1972

3,660,519
PROCESS FOR PRODUCING HIGHER OLEFINS
Takaaki Arakawa, Iwakuni, and Yoshikuni Sato, Yamaguchi-ken, Japan, assignors to Mitsui Petrochemical Industries, Ltd., Tokyo, Japan
No Drawing. Filed Aug. 14, 1970, Ser. No. 63,904
Claims priority, application Japan, Aug. 20, 1969, 44/65,314
Int. Cl. C07c 3/10
U.S. Cl. 260—683.15 D    10 Claims

ABSTRACT OF THE DISCLOSURE $C_8$–$C_{20}$ olefins having high linearity are obtained at high selectivity by oligomerizing ethylene at a temperature of $-30°$ C. to $+50°$ C. in a solvent in the presence of a catalyst, the catalyst being prepared by (a) reacting at least one titanium compound such as titanium tetrachloride with at least one organic electron donor such as acetone, acrylonitrile or triethyl phosphine, (b) adding to the reaction product an aluminum alkyl halide containing more than 1.5 and not more than 2.9 bonded halogen atoms per atom of aluminium, such as ethyl aluminium dichloride, and (c) adding at least one organosulfur compound such as ethyl mercaptan or diphenyl disulfide to the resulting mixture. These olefins are useful as the materials of plasticizers and detergents.

---

This invention relates to a process for producing higher olefins useful as the materials of plasticizers and detergents. More specifically, the invention relates to a process for producing higher olefins having a high linearity with 8 to 20 carbon atoms at high selectivities by oligomerizing ethylene in the presence of a catalyst comprising a reaction product of a titanium compound and an organic electron donor, an aluminium alkyl halide, and an organosulfur compound.

It has already been known to produce higher olefins by polymerizing ethylene in the presence of a binary-component catalyst composed of titanium tetrachloride and an aluminium alkyl halide. The higher olefins thus obtained, however, have too high a degree of polymerization, and it is impossible to obtain at high selectivity higher olefins having 8 to 20 carbon atoms which are useful as the materials of plasticizers and detergents. Most of the higher olefins obtained are waxy polyolefins having a molecular weight above 300, and this prior art has proved unsatisfactory for the commercial production of higher olefins with 8 to 20 carbon atoms.

Heretofore, the polymerization of olefins with a catalyst composed of a titanium compound, an organoaluminium compound and an organic compound containing oxygen, nitrogen, sulfur or phosphorous atom has been known. The prior method, however, is intended to produce high-molecular-weight polymers, and no recognition has been made as to the production of higher linear olefins.

We previously found that a catalyst composed of a reaction product of titanium tetrachloride and an organic compound containing at least one of oxygen, nitrogen, sulfur and phosphorus atoms and an aluminium alkyl halide having 1.8 to 2.8 bonded halogen atoms per atom of aluminium was effective for the production of higher linear olefins having 8 to 20 carbon atoms. The reaction product obtained by using this catalyst still contained some higher olefins having 22 or more carbon atoms. Since it would be commercially advantageous to increase the selectivity of products having 8 to 20 carbon atoms while reducing the amounts of higher products having 22 carbon atoms or more, we have extensively worked on the methodsof producing higher linear olefins having 8 to 20 carbon atoms at high selectivities while further reducing the amounts of higher products with 22 or more carbon atoms.

According to the present invention, there is provided a process for producing higher olefins which comprises oligomerizing ethylene at a temperature in the range of $-30°$ C. to $+50°$ C. in a solvent in the presence of a catalyst, said catalyst being prepared by (a) reacting at least one titanium compound expressed by the formula $Ti(OR)_nCl_{4-n}$, wherein R is an alkyl group having 1 to 8 carbon atoms, and $n$ is an integer of 0 to 4, with at least one organic electron donor containing at least one of oxygen, nitrogen, phosphorous and sulfur atoms, (b) adding to the resulting reaction product an aluminium alkyl halide containing more than 1.5 and not more than 2.9 bonded halogen atoms per atom of aluminium, and (c) adding at least one organosulfur compound to the resulting mixture.

The examples of the preferred titanium compounds expressed by the formula $Ti(OR)_nCl_{4-n}$, wherein R is an alkyl group having 1 to 8 carbon atoms and $n$ is an integer of 0 to 4, include, for instance, titanium tetrachloride, tetramethoxy titanium, tetraethoxy titanium, tetrabutoxy titanium, diethoxy titanium dichloride, dibutoxy titanium dichloride, ethoxy titanium trichloride, and butoxy titanium trichloride. These titanium compounds are used either alone or in admixtures.

As the organic electron donor to be reacted with the aforementioned titanium compound in the preparation of the catalyst used in the present invention, there can be cited oxygen-containing compounds such as ketones, esters, ethers and phenols; nitrogen-containing compounds such as nitriles, amines, and ureas; phosphorus-containing compounds such as tertiary phosphines; and organosulfur compounds such as mercaptans, thioethers, thiophenols, thioureas, sulfones, sulfoxides, disulfides and thiazoles. More specifically, the examples of the ketones are ketones having 3 to 30, preferably 3 to 12, carbon atoms, for instance, aliphatic ketones such as diethyl ketone, diisopropyl ketone, acetone and acetyl acetone, and aromatic ketones such as acetophenone. The examples of esters include esters having 2 to 48, preferably 2 to 24, carbon atoms, for instance, aliphatic monocarboxylic acid esters such as methyl formate, ethyl formate, propyl formate, butyl formate, ethyl acetate, propyl acetate, amyl acetate, phenyl acetate, methyl propionate, ethyl propionate and ethyl butyrate; aliphatic dicarboxylic acid esters such as dimethyl oxalate, diethyl oxalate, dimethyl malonate and diethyl succinate; and aromatic carboxylic acid esters such as methyl benzoate, ethyl benzoate, dimethyl phthalate, and dibutyl phthalate. The exemplary ethers are ethers having 2 to 30, preferably 2 to 12, carbon atoms, for instance, dialkyl ethers such as diethyl ether, dipropyl ether and dibutyl ether; allyl alkyl ethers such as allyl ethyl ether and allyl butyl ether; and cyclic ethers such as tetrahydrofuran and dioxane. The exemplary phenols are phenols with 6 to 40, preferably 6 to 18, carbon atoms such as phenol, cresol, 2,6-dimethyl phenol, and 2,6-di-t-butyl phenol.

Specific examples of the nitriles include nitriles having 2 to 30, preferably 2 to 12, carbon atoms, for instance, aliphatic nitriles such as acetonitrile, propionitrile, malonitrile and acrylonitrile, and aromatic nitriles such as benzonitrile. The examples of amines are amines having 1 to 30, preferably 2 to 12, carbon atoms, for instance, aliphatic amines such as methylamine, ethylamine, allylamine, propylamine, butylamine and amylamine, aromatic amines such as aniline, nitroaniline, chloroaniline, toluidine and aminobenzoic acid, and secondary and tertiary amine derivatives of these. The exemplary ureas are urea and urea derivatives having 1 to 35, preferably 1 to 13, carbon atoms such as dimethylurea and diphenylurea.

The exemplary tertiary phosphines include those having 3 to 48, preferably 3 to 24, carbon atoms such as triisopropyl phosphine, triethyl phosphine, trimethyl phosphine and triphenyl phosphine.

The examples of the organosulfur compounds are those having 1 to 40, preferably 1 to 15, carbon atoms, for instance, lower alkyl mercaptans such as methyl mercaptan, ethyl mercaptan, propyl mercaptan and butyl mercaptan; thioethers such as ethyl sulfide, phenyl sulfide and thiophene; thiophenols; sulfones such as divinyl sulfone, diphenyl sulfone, dimethyl sulfone and diethyl sulfone; sulfoxide such as dimethyl sulfoxide; thioureas such as thiourea and N,N'-diphenyl thiourea; disulfides such as diphenyl disulfide; thiazoles such as 2-mercaptobenzothiazole; and thiouracil.

These compounds may be used either alone or in admixtures.

The reaction between the titanium compound and the organic electron donor proceeds by maintaining these compounds in a solvent usable for the oligomerization of ethylene, at a temperature of $-30°$ C. to $+100°$ C., preferably $-10°$ C. to $+80°$ C. usually for a period of 5 to 60 minutes.

The aluminium alkyl halide to be added to the reaction product so obtained has more than 1.5 and not more than 2.9 bonded halogen atoms per atom of aluminum, and the preferred examples of this compound include, for instance, aluminium alkyl dihalides such as methyl aluminium dichloride, ethyl aluminium dichloride, ethyl aluminium dibromide, propyl aluminium dichloride and butyl aluminium dichloride. These aluminium alkyl dihalides may be used either alone or in admixtures. Also usable are mixtures of trialkyl aluminiums, dialkyl aluminium halides, alkyl aluminium sesquihalides, alkyl aluminium dihalides and aluminium trihalides which contain more than 1.5 and not more than 2.9 bonded halogen atoms per atom of aluminium.

The aluminium alkyl halide is added to the reaction product of the titanium compound and the organic electron donor at a temperature in the range of $-30°$ C. to $+80°$ C., preferably $-10°$ C. to $+40°$ C.

The catalyst of the invention is prepared by adding the aluminium alkyl halide to the reaction product between the titanium compound and the organic electron donor, and thereafter adding the organosulfur compound to the resulting mixture. The exemplary organosulfur compounds are those having 1 to 40, preferably 1 to 15, carbon atoms, for instance, lower alkyl mercaptans such as methyl mercaptan, ethyl mercaptan, propyl mercaptan, and butyl mercaptan; thioethers such as ethyl sulfide, phenyl sulfide and thiophene; thiophenols; sulfones such as divinyl sulfone, diphenyl sulfone, dimethyl sulfone, and diethyl sulfone; sulfoxides such as diethyl sulfoxide; thioureas such as thiourea and N,N'-diphenyl thiourea; disulfides such as diphenyl disulfide; thiazoles such as 2-mercaptobenzothiazole; and thiouracil.

It is important that in the preparation of the catalyst of the present invention, the process steps should be carried out in the order specified in the present invention. The reaction between the titanium compound and the organic electron donor should be performed (step a) first; and the aluminium alkyl halide should then be added to the reaction product (step b); and finally, the organosulfur compound is added to the resulting mixture (step c). It has been found that when, for instance, the organic electron donor is added to a reaction product of the titanium compound and the aluminium alkyl halide, or when the organic sulfur compound is added to the reaction product of the titanium compound and the organic electron donor and then aluminium alkyl halide is added, the resulting catalyst gives only a low selectivity.

The organosulfur compound may be added directly to the mixture of the reaction product of the titanium compound and the organic electron donor with the aluminium alkyl halide, or after aging the mixture for 1 to 60 minutes at a temperature in the range of $-20°$ C. to $+50°$ C.

When an organosulfur compound is used as the electron donor to be reacted with the titanium compound, the organosulfur compound to be added after adding the aluminium alkyl halide may be the same or different from the first-mentioned organosulfur compound. It is absolutely necessary however that the aforementioned three steps a, b and c should be carried out in this order.

As regards the amounts of the ingredients used in the preparation of the catalyst of the present invention, the aluminium alkyl halide is used in an amount of 0.3 to 20 mols, preferably 1 to 15 mols, per mol of the titanium compound, and the organic electron donor, in an amount of 0.1 to 4 mols per mol of the titanium compound. The amount of the organosulfur compound which can be used in the present invention is 0.0001 to 1 mol per mol of the titanium compound. The preferred amount of the organosulfur compound, which is markedly effective in increasing the selectivities of olefins having 8 to 20 carbon atoms, is in the range of 0.001 to 0.5 mol per mol of the titanium compound.

In a preferred embodiment of preparing the catalyst used in the invention, the titanium compound is first dissolved or suspended in a suitable solvent, and then reacted with the organic electron donor, followed by addition of the aluminium alkyl halide to the reaction product and finally addition of the organosulfur compound.

As the solvent, there may be used, aliphatic or aromatic hydrocarbons such as pentane, hexane, heptane, benzene, toluene and xylene, alicyclic hydrocarbons such as cyclohexane and methyl cyclohexane, and halogenated aliphatic or aromatic hydrocarbons such as dichloroethane, dichloromethane, trichloroethane chlorobenzene, bromobenzene and O-dichlorobenzene. When ethylene is polymerized under conditions such as to maintain it liquid, the ethylene can serve concurrently as the solvent, thus obviating the need for any particular solvent.

The oligomerization of ethylene can be performed by introducing ethylene into a solution or suspension of the catalyst. The polymerization temperature that can be employed in the invention ranges from $-30°$ C. to $+50°$ C., preferably $-20°$ C. to $+40°$ C. The reaction pressure may be atmospheric, reduced or superatmospheric, but the pressures from atmospheric pressure to 50 kg./cm.$^2$ give favorable results.

The suitable rate of introducing ethylene is about 4 to 300 liters per hour NTP per mol of the titanium compound, and the reaction time is in the range of 5 to 180 minutes.

The higher olefins obtained by the present invention can be separated into the desired fractions by distillation, and the products of higher purity can be obtained by removing the catalyst ingredients by means of a suitable purifying agent in conjunction with the distillation step.

According to the present invention, higher olefins having high linearity (tetramer to decamer of ethylene) are formed selectively, and there is less formation of unwanted waxy polyethylene. Since the reaction of the invention can be performed under mild conditions, the process of the invention is commercially advantageous both in respect of operation and equipment.

The process of the invention will be described in greater detail by the following examples. The number of carbon atoms in the reaction products and the linearity of $C_8$–$C_{20}$ olefins were measured by gas chromatography. The term "linearity" is defined as the number of unbranched carbon atoms per 100 carbon atoms in an olefin. For instance, if we say that $C_{10}$ olefin has a linearity of 95%, it means that the total of five branches are present in ten molecules of the $C_{10}$ olefin.

Examples 1 to 2 and Comparative Examples 1 to 2

A 300 ml. nitrogen-purged glass reactor equipped with a stirrer was charged with 100 ml. of toluene as solvent, and 2 millimols (mmols) of titanium tetrachloride was dissolved in it. The temperature of the interior of the reactor was lowered to −20° C. by cooling its wall surface, and then a predetermined amount of the organic electron donor shown in Table 1 was added. With thorough stirring, the reaction was performed for 15 minutes, and thereafter, 6 mmols of ethyl aluminum dichloride was added. Subsequently, a predetermined amount of the organo-sulfur compound described in Table 1 was added. After completion of producing the catalyst in this manner, ethylene was introduced into the reactor at a pressure somewhat higher than the atmospheric pressure (about 50 to 200 mm. of Hg). The temperature was raised gradually, and the polymerization of ethylene was carried out for 60 minutes at 0° C.

The reaction products were analyzed by gas-chromatography. The results obtained are shown in Table 1.

The foregoing procedure was repeated except that thiophenol was not added in the preparation of the catalyst (Comparative Example 7). The resulting product weighed 125 g., and consisted of 24.5 g. of olefins having not more than 6 carbon atoms, 71.0 g. of olefins having 8 to 20 carbon atoms, and 29.5 g. of olefins having 22 or more carbon atoms. The selectivity of the olefins having 8 to 20 carbon atoms was 57%, and their linearity was 97%.

Examples 16 to 18

The procedure of Example 15 was repeated except as noted below. A predetermined amount of the organic electron donor indicated in Table 3 was used instead of 4 mmols of phenyl acetate, and 0.02 mmol of diphenyl disulfide was used instead of 0.08 mmol of thiophenol. The results obtained are shown in Table 3.

TABLE 1

| | Organic electron donor (mmols) | Organosulfur compound (mmols) | Yield (g.) | Selectivity (wt. percent) | | | Linearity (percent) of $C_8$–$C_{20}$ |
|---|---|---|---|---|---|---|---|
| | | | | $C_6$ | $C_8$–$C_{20}$ | $C_{22}$ | |
| Example: | | | | | | | |
| 1 | Allyl ethyl ether (2.0) | Thiourea (0.01) | 51 | 8 | 84 | 8 | 95 |
| 2 | Acrylonitrile (1.0) | Ethyl mercaptan (0.04) | 54 | 10 | 87 | 3 | 94 |
| Comparative Example: | | | | | | | |
| 1 | | | 47 | 1 | 55 | 44 | 84 |
| 2 | Allyl ethyl ether (2.0) | | 50 | 7 | 74 | 19 | 95 |

Examples 3 to 14 and Comparative Examples 3 to 6

A 300 ml. argon-purged autoclave was charged with 100 ml. of the solvent indicated in Table 2. Two millimols of titanium tetrachloride and a predetermined amount of the organic electron donor indicated in Table 2 were added, followed by thorough stirring and cooling. Thereafter, at 0° C., 6 mmols of ethyl aluminium dichloride was added, and then a predetermined amount of the organosulfur compound indicated in Table 2 was added. After completion of producing the catalyst in this way, ethylene was introduced with vigorous stirring, and reacted for 60 minutes at a pressure of 20 kg./cm.². The results obtained are shown in Table 2.

TABLE 3

| Ex. | Organic electron donor (mmols) | Yield (g.) | Selectivity (wt. percent) | | | Linearity (percent) of $C_8$–$C_{20}$ |
|---|---|---|---|---|---|---|
| | | | $C_6$ | $C_8$–$C_{20}$ | $C_{22}$ | |
| 16 | Urea (2.0) | 251 | 19 | 71 | 10 | 98 |
| 17 | Urea (1.0) and acrylonitrile (1.0) | 219 | 17 | 74 | 9 | 99 |
| 18 | Acetone (2.0) and acrylonitrile (1.0) | 192 | 17 | 73 | 10 | 99 |

Example 19 and Comparative Examples 8 to 9

These examples will illustrate that the order of the process steps in the preparation of the catalyst is of importance in the present invention.

TABLE 2

| | Organic electron donor (mmols) | Organosulfur compound (mmols) | Solvent | Yield (g.) | Selectivity (wt. percent) | | | Linearity (percent) of $C_8$–$C_{20}$ |
|---|---|---|---|---|---|---|---|---|
| | | | | | $C_6$ | $C_8$–$C_{20}$ | $C_{22}$ | |
| Examples: | | | | | | | | |
| 3 | Acetylacetone (1.0) | Diphenyl disulfide (0.08) | Chlorobenzene | 36 | 21 | 72 | 7 | 96 |
| 4 | Allyl ethyl ether (1.0) | Thiourea (0.01) | Toluene | 42 | 20 | 72 | 8 | 99 |
| 5 | Acrylonitrile (1.0) | Ethyl mercaptan (0.04) | do | 58 | 23 | 71 | 6 | 98 |
| 6 | Benzonitrile (1.0) | Isopropyl mercaptan (0.5) | Chlorobenzene | 65 | 20 | 74 | 6 | 98 |
| 7 | α-Naphthylamine (2.0) | Diphenyl sulfide (0.04) | Toluene | 78 | 19 | 72 | 9 | 97 |
| 8 | n-Butylamine (2.0) | Thiophenol (1.0) | do | 40 | 17 | 73 | 10 | 97 |
| 9 | Acetone (2.0) | Diphenyl disulfide (0.02) | do | 42 | 19 | 72 | 9 | 98 |
| 10 | Triethyl phosphine (2.0) | Ethyl mercaptan (0.02) | do | 50 | 22 | 73 | 5 | 98 |
| 11 | 2-mercaptobenzothiazole (2.0) | Diphenyl sulfone (0.02) | do | 45 | 19 | 73 | 8 | 98 |
| 12 | 2,6-dimethyl phenol (1.0) | Thiourea (0.01) | do | 51 | 19 | 76 | 5 | 99 |
| 13 | Diphenyl thiourea (2.0) | Thiophene (0.01) | Mixed xylenes | 51 | 21 | 71 | 8 | 99 |
| 14 | Ethyl mercaptan (1.0) | Ethyl sulfide (0.02) | do | 55 | 17 | 73 | 10 | 98 |
| Comparative Examples: | | | | | | | | |
| 3 | Acetyl acetone (1.0) | | Chlorobenzene | 30 | 22 | 60 | 18 | 95 |
| 4 | Allyl ethyl ether (2.0) | | do | 31 | 10 | 65 | 25 | 97 |
| 5 | Triethyl phosphine (1.0) | | do | 60 | 22 | 63 | 15 | 96 |
| 6 | | | Toluene | 48 | 15 | 33 | 52 | 90 |

Example 15 and Comparative Example 7

A 1-liter argon-purged autoclave was charged with 400 ml. of toluene as solvent, and 4 mmols of titanium tetrachloride and 4 mmols of phenylacetate were added. After stirring for 5 minutes, 12 mmols of ethyl aluminium dichloride was added at room temperature. The mixture was stirred for 30 minutes at 0° C., followed by addition of 0.08 mmol of thiophenol. After completion of producing the catalyst in this way, ethylene was introduced with vigorous stirring, and reacted for 60 minutes at 0° C. and 20 kg./cm.².

The product obtained weighed 178 g., and consisted of 46.4 g. of olefins having not more than 6 carbon atoms, 124.5 g. of olefins having 8 to 20 carbon atoms, and 7.1 g. of olefins having 22 or more carbon atoms. The selectivity of olefins having 8 to 20 carbon atoms was 70%, and their linearity was 99%.

A 1-liter argon-purged autoclave was charged with 400 ml. of toluene, and 4 mmols of titanium tetrachloride (designated as component A) and 4 mmols of 2,6-di-t.-butyl phenol (designated as component B) were added. The mixture was stirred for 20 minutes at 50° C., and then 12 mmols of ethyl aluminium dichloride (designated as component C) was added, and the mixture was stirred for 30 minutes at 0° C. Thereafter, 0.08 mmol of ethyl sulfide (designated as component D) was added to form a catalyst. Ethylene was then introduced with vigorous stirring for 60 minutes at 0° C. and 20 kg./cm.². The results obtained are shown in Table 4 in the row headed by "Example 19."

The foregoing procedure was repeated except that in the preparation of the catalyst, component D was added to the reaction mixture of components A and B and then component C was added. The results obtained are shown in Table 4 in the row headed by "Comparative Example 8."

The procedure taken above was repeated except that components A and C were added to the toluene in the autoclave and mixed with stirring at 0° C. for 10 minutes, and then on addition of component B, the mixture was stirred for 20 minutes at 50° C., followed finally by adding component D. The results obtained are shown in Table 4 in the row headed by "Comparative Example 9."

TABLE 4

| | Yield (g.) | Selectivity (wt. percent) | | | Linearity (percent) of $C_8$–$C_{20}$ |
|---|---|---|---|---|---|
| | | $C_6$ | $C_8$–$C_{20}$ | $C_{22}$ | |
| Example 19 | 204 | 23 | 70 | 7 | 99 |
| Comparative example: 8 | 172 | 15 | 61 | 24 | 99 |
| Do | 85 | Trace | 15 | 85 | 99 |

Example 20 and Comparative Example 10

These examples will illustrate that the organosulfur compound to be added in the last step in the preparation of the catalyst has serious effects on the activity of the catalyst.

A 1-liter argon-purged autoclave was charged with 400 ml. of methyl cyclohexane as solvent, and 4 mmols of titanium tetrachloride and 2 mmols of isopropyl mercaptan were added. The resulting mixture was stirred, and then 12 mmols of ethyl aluminium dichloride was added at 0° C. After stirring for 30 minutes, 0.08 mmol of isopropyl mercaptan was added. With vigorous stirring, ethylene was introduced, and reacted for 60 minutes at 0° C. and 20 kg./cm.², The results are shown in Table 5 in the row headed by "Example 20."

For comparison, the foregoing procedure was repeated except that the amount of isopropyl mercaptan was changed to 2.08 mmols, and isopropyl mercaptan was not added after the addition of the ethyl aluminium dichloride in the preparation of the catalyst. The results obtained are shown in Table 5 in the row headed by "Comparative Example 10."

TABLE 5

| | Yield (g.) | Selectivity (wt. percent) | | | Linearity (percent) of $C_8$–$C_{20}$ |
|---|---|---|---|---|---|
| | | $C_6$ | $C_8$–$C_{20}$ | $C_{22}$ | |
| Example 20 | 155 | 18 | 74 | 8 | 99 |
| Comparative Example 10 | 141 | 18 | 63 | 19 | 98 |

In Example 20, the organic electron donor to be reacted with the titanium compound was the same compound as the organosulfur compound to be added lastly in the preparation of the catalyst. In Comparative Example 10, the total amount of isopropyl mercaptan used in Example 20 (the total amount used as the organic electron donor and the organosulfur compound) was used as the organic electron donor to be reacted with the titanium compound, and the use of the organosulfur compound to be added in the last step of the catalyst preparation was omitted. It is seen from the results obtained that the selectivity of $C_8$–$C_{20}$ olefins was markedly reduced. These experiments would suggest that isopropyl mercaptan to be added as the organic electron donor plays a different role in the catalyst preparation from isopropyl mercaptan to be added as the organosulfur compound in the last step. It is especially noteworthy that the organosulfur compound to be added lastly, in spite of its small quantity, gives a great effect to the activity of the resulting catalyst.

Examples 21 to 23 and Comparative Example 11

A 300 ml. argon-purged autoclave was charged with 100 ml. of toluene as solvent, and 2 mmols of the titanium compound indicated in Table 6 and 1 mmol of acrylonitrile were added. After thorough stirring and cooling, 12 mmols of ethyl aluminium dichloride was added. This was followed by addition of a predetermined amount of the organosulfur compound indicated in Table 6 to form a catalyst. With vigorous stirring, ethylene was introduced, and reacted for 60 minutes at 0° C. and 20 kg./cm.². The results obtained are shown in Table 6.

TABLE 6

| | Titanium compound | Organosulfur compound (mmol) | Yield (g.) | Selectivity (wt. percent) | | | Linearity (percent) of $C_8$–$C_{20}$ |
|---|---|---|---|---|---|---|---|
| | | | | $C_6$ | $C_8$–$C_{20}$ | $C_{22}$ | |
| Examples: | | | | | | | |
| 21 | Ti(OCH$_3$)$_4$ | Thiophenol (0.08) | 45 | 20 | 70 | 10 | 98 |
| 22 | Ti(OCH$_3$)$_4$ | Diphenyldisulfide (0.02) | 46 | 20 | 70 | 10 | 98 |
| 23 | Ti(OC$_2$H$_5$)$_2$Cl$_2$ | Thiourea (0.01) | 63 | 18 | 71 | 11 | 99 |
| Comparative Example 11 | Ti(OC$_2$H$_5$)$_3$Cl$_2$ | | 57 | 19 | 43 | 38 | 97 |

Examples 24 to 26

A 300 ml. argon-purged autoclave was charged with 100 ml. of toluene. Two millimols of titanium tetrachloride and two millimols of acrylonitrile were added, followed by thorough stirring and cooling. Thereafter, at 0° C., 6 mmols of ethyl aluminum dichloride was added, and then 0.02 mmols of the organosulfur compound indicated in Table 7 was added. After completion of producing the catalyst in this way, ethylene was introduced with vigorous stirring, and reacted for 60 minutes at a pressure of 20 kg./cm.². The results obtained are shown in Table 7.

TABLE 7

| Ex. | Organosulfur compound | Yield (g.) | Selectivity (wt. percent) | | | Linearity (percent) of $C_8$–$C_{20}$ |
|---|---|---|---|---|---|---|
| | | | $C_6$ | $C_8$–$C_{20}$ | $C_{22}$ | |
| 24 | Thiouracil | 53 | 21 | 70 | 9 | 98 |
| 25 | 2-mercaptobenzothiazole | 49 | 19 | 70 | 11 | 98 |
| 26 | Dimethyl sulfoxide | 48 | 17 | 71 | 12 | 98 |

Examples 27 to 30 and Comparative Example 12

Five millimols of titanium tetrachloride and 4 mmols of acetone were reacted in 100 ml. of toluene, and a mixture of the aluminium compounds indicated in Table 8 was added. (In Comparative Example 12, only ethyl aluminium sesquichloride was added.) Thereafter 0.08 mmols of thiophenol was added to form a catalyst. Using the resultant catalyst, ethylene was polymerized for 60 minutes at 20 kg./cm.$^2$. The results obtained are shown in Table 8.

TABLE 8

| Aluminium compounds (mmols) | Yield (g.) | Selectivity (wt. percent) | | | Linearity (percent) of $C_8$–$C_{20}$ |
|---|---|---|---|---|---|
| | | $C_6$ | $C_8$–$C_{20}$ | $C_{22}$ | |
| Example: | | | | | |
| 27 ........ {Triethyl aluminum (3), Diethyl aluminium chloride (1)} | 108 | 18 | 74 | 8 | 98 |
| 28 ........ {Aluminium trichloride (6), Diethyl aluminium chloride (1), Ethyl aluminium dichloride (9)} | 112 | 19 | 73 | 8 | 98 |
| 29 ........ {Diethyl aluminium chloride (4), Ethyl aluminium dichloride (8)} | 102 | 22 | 65 | 13 | 97 |
| 30 ........ {Triethyl aluminium (5), Aluminium drichloride (7)} | 105 | 21 | 67 | 12 | 97 |
| Comparative Example 12 ... Ethyl aluminium sesquichloride (12) | 65 | 18 | 53 | 29 | 97 |

We claim:

1. A process for producing higher olefins which comprises oligomerizing ethylene at a temperature in the range of $-30°$ to $+50°$ C. in a solvent in the presence of a catalyst, said catalyst being prepared by (a) reacting at least one titanium compound expressed by the formula $Ti(OR)_nCl_{4-n}$, wherein R is an alkyl group having 1 to 8 carbon atoms, and n is an integer of 0 to 4, with at least one organic electron donor containing at least one of oxygen, nitrogen, phosphorus and sulfur atoms, (b) adding to the resulting reaction product an aluminium alkyl halide containing more than 1.5 and not more than 2.9 bonded halogen atoms per atom of aluminium, and (c) adding at least one organosulfur compound to the resulting mixture.

2. A process according to claim 1 wherein the amount of said organic electron donor is 0.1 to 4 mols per mol of said titanium compound.

3. A process according to claim 1 wherein the amount of said aluminium alkyl halide is 0.3 to 20 mols per mol of said titanium compound.

4. A process according to claim 1 wherein the amount of said organosulfur compound is 0.0001 to 1 mol per mol of said titanium compound.

5. A process according to claim 1 wherein said solvent is a hydrocarbon or a halogenated hydrocarbon.

6. A process according to claim 1 wherein said organic electron donor is an oxygen-containing organic compound selected from the group consisting of ketones having 3 to 30 carbon atoms, esters having 2 to 48 carbon atoms, ethers having 2 to 30 carbon atoms and phenols having 6 to 40 carbon atoms.

7. A process according to claim 1 wherein said organic electron donor is a nitrogen-containing compound selected from the group consisting of nitriles having 2 to 30 carbon atoms, amines having 1 to 30 carbon atoms and ureas having 1 to 35 carbon atoms.

8. A process according to claim 1 wherein said organic electron donor is a tertiary phosphine having 3 to 48 carbon atoms.

9. A process according to claim 1 wherein said organic electron donor is an organosulfur compound having 1 to 40 carbon atoms selected from the group consisting of lower alkyl mercaptans, thiophenols, sulfones, sulfoxides, thioureas, disulfides, thiazoles and thiouracil.

10. A process according to claim 1 wherein said organosulfur compound is an organic compound having 1 to 40 carbon atoms selected from the group consisting of lower alkyl mercaptons, thioethers, thiophenols, sulfones, sulfoxides, thioureas, disulfides, thiazoles and thiouracil.

References Cited

UNITED STATES PATENTS 3,444,263   5/1969   Fernald et al. _____ 260—683.15
3,574,782   4/1971   Bearden et al. _____ 260—683.15
3,576,902   4/1971   Bearden et al. _____ 260—683.15

PAUL M. COUGHLAN, Jr., Primary Examiner

U.S. Cl. X.R.

252—429 B